United States Patent [19]

DeMarthe et al.

[11] 4,023,964

[45] May 17, 1977

[54] METHOD OF OBTAINING COPPER FROM COPPER-BEARING ORES

[75] Inventors: Jean-Michel DeMarthe, Viroflay; Alain Sonntag, Maurepas; André Georgeaux, Rambouillet, all of France

[73] Assignee: Societe Miniere et Metallurgique de Penarroya, Paris, France

[22] Filed: May 15, 1975

[21] Appl. No.: 577,659

[30] Foreign Application Priority Data

May 15, 1974 France .................. 74.16774

[52] U.S. Cl. .................. 75/101 R; 75/114; 75/117; 204/107; 423/24; 423/27; 423/38
[51] Int. Cl.² .................. C22B 15/08
[58] Field of Search .................. 423/24, 27, 38; 75/101 R, 101 BE, 117, 114; 204/107

[56] References Cited

UNITED STATES PATENTS

| 552,960 | 1/1896 | Hoepfner .................. 204/107 X |
| 3,785,944 | 1/1974 | Atwood et al. .................. 204/107 |
| 3,853,981 | 12/1974 | Hadzeriga .................. 75/101 BE X |
| 3,923,616 | 12/1975 | Atadan et al. .................. 204/107 |

FOREIGN PATENTS OR APPLICATIONS

| 2,193,092 | 2/1974 | France |
| 73,179 | 7/1892 | Germany |
| 67,925 | 9/1891 | Germany |
| 1,020,795 | 12/1957 | Germany |

OTHER PUBLICATIONS

Kruger, *Chemie-Ingenieur Techick*, vol. 45, No. 4, (1973), pp. 154–157.

*Primary Examiner*—G. Ozaki
*Attorney, Agent, or Firm*—Fleit & Jacobson

[57] ABSTRACT

The invention provides a method for obtaining electrolytic copper from copper-bearing ores which involves (a) lixiviating a sulphurized copper concentrate with an aqueous solution containing cupric chloride; (b) separating the solution resulting from the lixiviation stage (a) into two parts, one of said parts, containing at least 1 gram of cuprous ions per liter and at least 2 grams of ferrous ions per liter, being subjected to oxidation by air at atmospheric pressure, at a pH value between 1 and 3, and at a temperature above 90° C., resulting in the precipitation of goethite [FeO(OH)] which is separated, and the resulting solution then recycled to the lixiviation stage (a); (c) partially extracting the copper contained in the other part of the solution resulting from the lixiviation stage (a) by contacting the solution with an organic phase containing a cationic solvent, this extraction being accompanied by oxidation by injection of air; (d) re-extracting the copper, now contained in the organic phase, by contacting the latter with an aqueous sulphuric acid solution and recycling the organic phase to extraction stage (c); and (e) treating the copper sulphate solution obtained from the preceding stage (d) to obtain, on the one hand, elemental copper, and, on the other hand, an aqueous sulphuric acid solution which is recycled to the re-extraction stage (d), the major part of the aqueous phase resulting from stage (c) at which copper is partially extracted being recycled to the lixiviation stage (a).

15 Claims, 2 Drawing Figures

METHOD OF OBTAINING COPPER FROM COPPER-BEARING ORES

The present invention concerns a hydrometallurgical method for the treatment of sulphurized copper concentrates, which treatment is particularly applicable to copper ores such as bornite, chalcopyrite and chalcocite. It is well-known that these copper-bearing ores are always accompanied by gangue or other types of ore such as pyrites, quartz and calcite, the major portion of this gangue being eliminated during the preliminary stage in the concentration of the ore. A concentrate is thus obtained which contains for example approximately 15 to 50% of copper and 5 to 35% of iron.

In Patent Application, Ser. No. 577,658, filed concurrently herewith, and entitled "Method of obtaining copper from sulphurized concentrates", the present inventors have described a method for the treatment of such concentrates comprising, in succession, the following stages:

a. lixiviation of said sulphurized concentrate by an aqueous solution, having a pH-value of at most 1 and containing cupric chloride formed in situ, at least in part, by oxidation, by means of hydrochloric acid and air, of the cuprous chloride solution resulting from the lixiviation;

b. partial extraction of the copper contained in the lixiviation solution resulting from the preceding stage, by contacting said lixiviation solution with an organic phase containing a cationic solution, said extraction being accompanied by oxidation by injection of air;

c. re-extraction of the copper contained in said organic phase by contacting the latter with an aqueous solution of sulphuric acid and recycling the organic phase to the extraction stage (b); and d. electrolysis of the copper sulphate solution obtained in the preceding stage, with a yield on the one hand of copper and on the other of an aqueous solution of sulphuric acid which is recycled to the re-extraction stage (c), part at least of the aqueous phase, which results from the partial copper extraction stage (b), being recycled to the lixiviation stage (a) and constituting a part of said cupric chloride solution.

Preferably, in that method the part of the aqueous phase resulting from the extraction stage (b) that is not recycled to the lixiviation stage (a) is treated in the customary manner to recover, at least partially, the metals that it contains, with the exception of iron, and it is then subjected to pyrohydrolysis to produce iron oxide and hydrochloric acid, the latter being recycled to the lixiviation stage (a).

Specialists in this field will readily appreciate that the method forming the subject-matter of the above-mentioned application enables metallic copper to be obtained by electrolysis in a sulphate medium, permits the iron contained in the original sulphurized concentrate to be eliminated in the form for oxide, and also allows of the elimination, in elementary form, of the sulphur associated with this concentrate, thus avoiding oxidation of the sulphur into sulphurous anhydride or sulphate.

One object of the present invention is to provide a modified form of the above-mentioned method which enables the iron contained in the initial sulphurized concentrate to be eliminated not in oxide form but in the form of hydrated oxide which can be readily filtered.

A further object of the invention is therefore to provide a method in which the pyrohydrolysis stage specified above is suppressed, with the advantages that such suppression provides as regards reduced capital outlay and operating costs.

According to the invention, these and other objects which will appear hereinafter are achieved by a method of the abovestated kind in which the lixiviation stage (a) is modified as follows: the initial sulphurized concentrate is subjected to lixiviation by an aqueous solution containing cupric chloride and, after lixiviation, this solution is separated from the reaction residue and divided into two parts. One of these is passed to stage (b) in which copper is extracted at least partially, whereas the other is subjected to oxidation by air at atmospheric pressure and using a pH-value of between 1 and 3, and at a temperature above 90° C with precipitation of goethite which is separated off, the resultant solution then being recycled for lixiviating fresh quantities of initial concentrate. The other stages of the method as defined above are not substantially changed.

It will be readily appreciated from the foregoing that the solution used for lixiviation which contains in particular cupric chloride is obtained entirely from two recyclings, one from the copper-extraction stage and the other from the air-oxidation stage with precipitation of goethite. In both of these two stages the spent solution resulting from lixiviation and mainly containing cuprous chloride is re-oxidized and may be used for the lixiviation of further quantities of sulphurized concentrate. This feature which constitutes one of the novel aspects of the method of the invention offers in particular the advantage of enabling the use of costly reagents to be reduced to a strict minimum.

The lixiviation solution preferably contains in addition an agent for solubilizing cuprous chloride that is selected from the group which comprises alkali metal chlorides, alkaline-earth metal chlorides, ammonium chloride and ferrous chloride. Advantageously, said solubilizing agent will be sodium chloride used in quantities of between 100 and 300 g/l.

Also, the temperature at which the lixiviation is carried out is preferably above 50° C, and the pH-value of the solution is at most 1.

Advantageously, the solution resulting from the oxidation stage with precipitation of goethite as mentioned above contains at least 1 g/l of cuprous ions and 2 g/l of ferrous ions.

Finally, regarding the quantity of lixiviation solution to be used, this may be between 1 and 1.05 Q.S., these letters designating the stoichiometrically necessary quantity, taking into account the quantity of non-ferrous metals present in the initial sulphurized concentrate.

The following description, to which the invention is in no way limited, will explain how the present invention can be practised. The description will refer to the annexed drawings which illustrate in a very diagrammatic manner the various stages in the method of the invention.

To make the description clearer, it will be divided into four parts corresponding to the four main stages in the treatment in question, namely: lixiviation of the initial sulphurized concentrate, purification with change of anion, electrolysis of the copper sulphate obtained and, finally, the elimination of impurities.

I. Lixiviation

Figure 1:
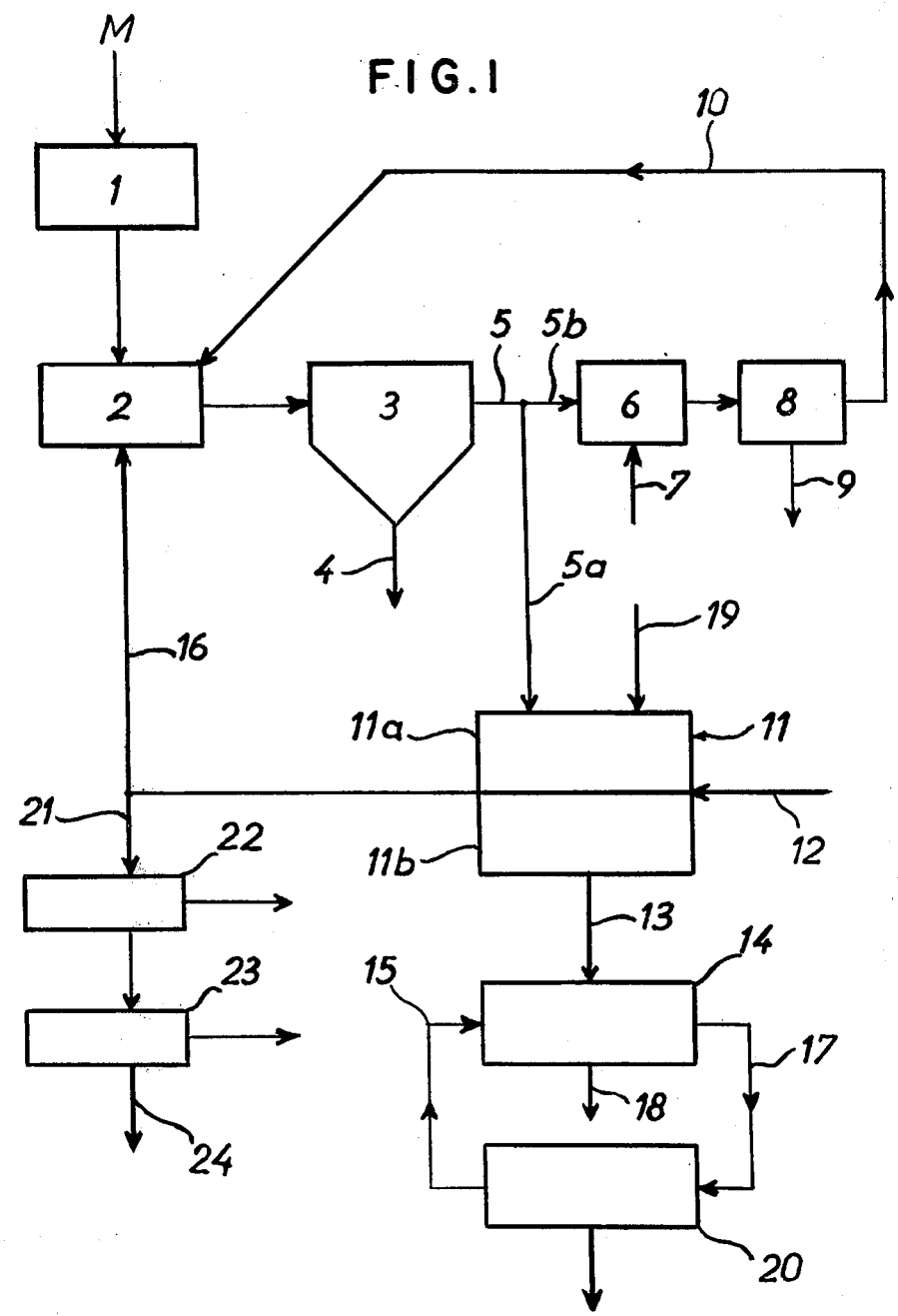
FIG. 1 shows the processing of copper ore by hydrometallurgy.

The initial ore M (FIG. 1) is, if need be, first subjected to a conventional concentrating and crushing operation at 1 and is then introduced into a lixiviation reaction vessel designated by the numeral 2 in the figure. In this reaction vessel the ore is contacted with a lixiviation solution, the source of which will be specified hereinafter and which mainly contains cupric chloride and an agent for solubilizing cuprous chloride such as for example sodium chloride. Example 1, described hereunder, indicates the operating conditions that may be used for this stage.

It should be noted that henceforward, bearing in mind the mechanism of the reaction, the oxido-reduction potential of the solution cannot be greater than that of a cupric chloride solution containing no cuprous chloride, that is to say 800 millivolts, the potential of a hydrogen electrode being taken as a reference.

EXAMPLE 1

This example deals with the reacting (or lixiviation) of a chalcopyrite, the composition of which is given in Table I below. This reaction was carried out on a continuous basis in two stages, the solid residue from the first lixiviation treatment being the product treated in the second. Details of the products used are also indicated in Table I below.

TABLE I

| | Weight (g) or Volume (ml) | Concentration (% or g/l) | | | |
|---|---|---|---|---|---|
| | | Cu | Fe | S | NaCl |
| Initial chalcopyrite | 70 | 29.4 | 21.6 | 23.7 | |
| Initial solution of first reaction | 1 000 | 52.4 | — | | 250 |
| Initial solution of second reaction | 1 000 | 52.0 | — | | 250 |

The lixiviation solution for the first reaction was first caused to boil (at 107° C) in a cylindrical reaction vessel which was agitated and was topped by an upwardly extending cooling means. At the moment of boiling, the 70 g of chalcopyrite from the French deposit at Burg in the Upper Pyrenees were added.

The reaction lasted 3 hours, during which time the variations in potential, in the concentration of cuprous ions and in the concentration of ferrous ions were checked.

At the end of three hours the solution was filtered and the residue was retained for the second reaction, and the filtrate was analyzed.

The second reaction was carried out in the same conditions as the first and, in particular, the solution was brought to boiling point before the residue from the previous reaction was introduced into it.

On completion of the reaction, which lasted three hours, the solution was filtered, and the residue was washed. The two reaction solutions, the residue and the washing solution were then analyzed. The results shown in Table II below were obtained.

TABLE II

| | Weight (g) or Volume (ml) | Concentration (% or g/l) | | | | |
|---|---|---|---|---|---|---|
| | | Cu | Fe | S | Cl | Na |
| Final solution of first reaction | 980 | 69.3 | 10.7 | 0.89 | 219 | 109 |

TABLE II-continued

| | Weight (g) or Volume (ml) | Concentration (% or g/l) | | | | |
|---|---|---|---|---|---|---|
| | | Cu | Fe | S | Cl | Na |
| Final solution of second reaction | 1070 | 55.6 | 3.65 | 0.23 | 197 | 91 |
| Solution from washing the residue | 500 | 0.32 | 0.002 | — | — | — |
| Final residue | 25 | 1.41 | 1.44 | 55.7 | — | 0.055 |

The distribution of the copper and iron in the chalcopyrite among the various products obtained from this treatment is shown in Table III below.

TABLE III

| | Solution of 1st reaction | Solution of 2nd reaction | Washing solution | Residue | Yield from reaction |
|---|---|---|---|---|---|
| Copper (%) | 65.9 | 31.9 | 0.7 | 1.5 | 98.5 |
| Iron (%) | 71.1 | 26.4 | trace | 1.4 | 98.6 |

It will thus be seen that this treatment of chalcopyrite enabled 98.5% of the copper contained in the initial product to be solubilized, but that only slight quantities of sulphur passed into solution.

The products obtained from the second lixiviation stage were first subjected at 3 to treatment, e.g. filtering or decantation, for separating the solid and liquid phases from each other. This resulted on the one hand in a solid residue 4 made up in particular of sulphur and the unreacted fraction of the initial product and, on the other hand of a solution 5, one part 5a of which was passed to the subsequent stage for extracting the copper, while the other part 5b was introduced into a reaction vessel 6 for carrying out oxidation and precipitation of goethite. The reaction vessel 6 was provided with stirring means, not illustrated, and a conventional device 7 for enabling air to be drawn in. A goethite precipitate was obtained which was separated at 8, for example by filtering, to obtain a cake of goethite 9, whereas the resulting solution 10 was recycled to the second lixiviation stage.

It has been seen that the solution that is used for the second lixiviation stage consists mainly of cupric chloride and an agent for solubilizing cuprous chloride. When lixiviation is carried out, the cupric chloride is reduced at least partially to the cuprous chloride state under the effect of the non-ferrous metals contained in the initial concentrate, in reactions approximating the following:

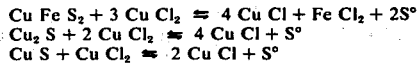

$$Cu\ Fe\ S_2 + 3\ Cu\ Cl_2 \rightleftarrows 4\ Cu\ Cl + Fe\ Cl_2 + 2S°$$
$$Cu_2\ S + 2\ Cu\ Cl_2 \rightleftarrows 4\ Cu\ Cl + S°$$
$$Cu\ S + Cu\ Cl_2 \rightleftarrows 2\ Cu\ Cl + S°$$

It might also be mentioned in this connection that these reactions, as stated above, enable the quantity of lixiviation solution that is to be used to be calculated.

In the reaction vessel 6, the solution 5b is subjected, in the presence of air introduced at 7, to a set of complex reactions having a double effect, namely that of re-oxidizing the cuprous chloride to form cupric chloride, and that of causing the iron contained in the solution and coming from the initial concentrate to be precipitated in the form of goethite FeO (OH).

It is known that the pH-value in the reaction vessel 6 is in fact between 1 and 3 as provided for in the invention, and it appears that under these conditions a kind of equilibrium is established between the acidity released by precipitation of the goethite and that consumed by the oxidation of the cuprous chloride.

However this may be, it is found that it is easily possible to adjust the pH-value to its optimum, no doubt because a "buffer" effect is caused that maintains it at the value corresponding to precipitation of the goethite.

The following Examples provide operating data for use in this oxidation-precipitation procedure.

EXAMPLE 2

The chemical mechanism briefly described above corresponds to the following total reaction:

$$2 Fe^{++} + 4 Cu^+ + 3/2 O_2 + H_2O \leftrightarrows 2 FeO(OH) + 4 Cu^{++}$$

It will thus be seen that it is necessary to oxidize two cuprous ions in order to precipitate simultaneously one ferrous ion in the form of goethite. The purpose of the present example is to verify this conclusion and thus to determine the validity of the hypotheses that have been put forward.

1,000 ml of a solution having the following composition:
NaCl : 250 g/l
$Cu^+$ : 13.8 g/l (in the form of CuCl)
$Fe^{++}$ : 16.2 g/l (in the form of $FeCl_2$)
$Cu^{++}$ : traces
were introduced into a reaction vessel having a porous plate at its base.

After the solution had been raised to a temperature of 95° C. ± 2° C, compressed air was introduced at the base of the reaction vessel at a rate of approximately 12 l/h. The formation of a brown precipitate of iron oxide was immediately observed, and this increased in quantity with time. During the period of the test, the $Cu^+$ and $Fe^{++}$ ions were continuously determined. The results obtained are shown in Table IV below:

TABLE IV

| Time Hours, minutes | Normality $Cu^+$ (N) | Normality $Fe^{++}$ (N) | Concentration $Cu^+$ g/l | Concentration $Fe^{++}$ g/l |
|---|---|---|---|---|
| 0 | 0.218 | 0.29 | 13.84 | 16.2 |
| 0.15 | 0.16 | 0.276 | 10.16 | 15.4 |
| 0.30 | 0.11 | 0.244 | 6.98 | 13.6 |
| 0.45 | 0.07 | 0.20 | 4.32 | 11.2 |
| 100 | 0.04 | 0.176 | 2.54 | 9.83 |

This table clearly shows that the hypothesis set out in the above equation can be verified. If for example the results expressed in normality are considered over the period zero to 30 minutes, it will be found that:

Number of moles of cuprous material consumed per liter:
0.218 − 0.11 = 0.108, and
Number of moles of ferrous material consumed per liter:
0.29 − 0.244 = 0.046
I.e.

$$\frac{\text{oxidized } Cu^+}{\text{oxidized } Fe^{++}} = 2.34$$

In other words, allowing for experimental errors, a relationship approximating the ratio 2, provided by the equation, exists.

On completion of the operation, the solution was filtered and the precipitate was analyzed, its composition was as follows:
Cu : 0.10%
Fe : 43.5%

This experiment clearly showed that a solution obtained from the lixiviation of a mixed copper and iron sulphide, by cupric chloride in a NaCl medium, such as was obtained upon completion of the operation described in Example 1 above can be freed from iron by precipitation of an iron oxide which is only slightly hydrated and can be readily filtered. This is a simple operation which can be carried out at ordinary pressure, the reagent being atmospheric air. On the other hand, it was found that the amount of copper entrained in the iron oxide precipitate is very limited.

As stated above, the cuprous chloride formed during the reaction is simultaneously re-oxidized to form cupric chloride, and for this reason it is available for recycling to the stage where the ore is reacted.

EXAMPLE 3

This example relates to the continuous reacting of a chalcopyrite with cupric chloride, with precipitation of goethite followed by regeneration of the cupric chloride. The layout of the operations corresponded precisely to that described above in relation to the aforesaid FIG. 1.

Chalcopyrite, $CuFeS_2$ was introduced at a rate of 23.2 g/h into the lixiviation reaction vessel 2, provided with stirring means, and a solution of cupric chloride regenerated at the liquid-liquid extraction stage was also introduced into the reaction vessel at a rate of 0.350 l/h. The solution 5, which resulted from the separation of the solid and liquid phases at 3, here achieved by filtering, was delivered at a rate of 0.700 l/h for reasons which will be explaind hereinafter. This solution 5 was divided into two parts, one of which, 5a, was passed to the liquid-liquid extraction stage at a rate of 0.350 l/h (therefore equal to the input rate for lixiviation), whereas the other part, 5b, was passed to the precipitation and oxidation reaction vessel 6 at the same rate i.e. 0.350 l/h. Air was introduced into the reaction vessel 6 through a porous plate at a sufficiently high rate to keep the pH-value between 1 and 3. After filtration of the goethite at 8, the solution 10 was passed to the lixiviation reaction vessel again at a rate of 0.350 l/h. Thus, 0.350 + 0.350 = 0.700 liter of cupric chloride solution enters the lixiviation reaction vessel 2, and this explains the value indicated above for the output rate from this reaction vessel.

The installation was started up by supplying thereto 2.5 liter of a synthetic solution having the following composition:
$Cu^{++}$ = 78.2 g/l
$Fe^{++}$ = 10.8 g/l This solution approximated the average solution resulting, during operations, from the simultaneous arrival of the cupric chloride solutions obtained from the liquid-liquid extraction, on the one hand, and from the reaction vessel 6, on the other. When the installation was started up, 57 g of fresh chalcopyrite were also introduced into the reaction vessel 2. This chalcopyrite, which came from Chile, had the following composition:

Cu = 29.1%
Fe = 27.2%

During the reaction the concentration of the cuprous ion varied between 25 and 30 g/l in the prime reaction vessel and between 2 and 8 g/l in the oxidation reaction vessel.

The tests lasted 8 hours 30 minutes. On completion of the reaction the following were recovered:

3.150 liters of reduced solution containing 788 g/l Cu and 15.5 g/l Fe, 62 g of goethite, containing 52.3% of iron and 0.99% Cu, 130 g of reaction residue containing 10.1% Cu and 21.0% Fe, and 0.7 g of residue in the reaction vessel that contained 5.0% Cu and 9.6% Fe.

Since the total amount of chalcopyrite introduced was 254 g, the yield of Cu from dissolution was therefore 81.78%.

This test shows that chalcopyrite can be continuously reacted with cupric chloride in a neutral medium to form cuprous chloride and ferrous chloride. Part of the cuprous chloride formed can be readily re-oxidized to form cupric chloride while at the same time iron is eliminated in hydroxide form. The cupric chloride regenerated in this manner is available for recycling to the lixiviation stage.

II. Purification and anion change

Referring again to FIG. 1, the lixiviation solution $5a$ is subjected at 11 to a purification treatment. This solution contains copper which is partially or entirely in the cuprous state depending upon the operating conditions used during the reaction, the solution also containing impurities that require to be eliminated.

Also, the treatment at 11 consists in selectively extracting copper in the cupric form by means of a cation-exchanger solvent. This solvent may for example be one of the reagents sold by General Mills under the tradename "LIX", or one of the agents marketed by Ashland under the name "KELEX".

In order to fully emphasize the inherent originality of this stage of the method in accordance with the invention, it might first of all be recalled that cation-exchanger solvents have, for a given metal, an extraction capacity which increases with the pH-value of the aqueous solution with which they are contacted.

This being the case, the exchange reaction can be written as follows in the case of copper:

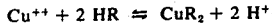

wherein $Cu^{++}$ represents the cupric ions contained in the aqueous phase, HR the cation exchanger in the organic phase, $CuR_2$ the organic copper complex obtained in the organic phase, and $H^+$ the acidity released in the aqueous phase.

It will thus be readily appreciated that in the case of a conventional cation exchange, extraction of the metal releases additional acidity in the aqueous phase and this correspondingly decreases the capacity of the solvent. When it is required to maintain the latter at its optimum value, it is necessary to neutralize the acidity that passes into the aqueous phase by means of NaOH or KOH or potassium solution for example, the total exchange reaction then being as follows:

As a result, extraction of the cation is generally accompanied by the consumption of acid and base.

In contrast, in the method in accordance with the invention and because of the specific properties of copper in a chloride medium, it is possible to extract the copper in the cupric form by using the maximum capacity of the solvent and at the same time avoiding the consumption of basic reagent which is usually necessary.

After lixiviation, the copper is in fact for the most part in the cuprous state. By contracting the solution with an organic solvent selected from those mentioned above, it becomes possible to extract the minor fraction of the copper in the cupric form by the above reaction. The first cation-exchange results in acidification of the extraction solution and thus in reduction of the coefficients of the division of the copper between the aqueous phase and the organic phase. It then suffices to inject air into the solution in order to oxidize part of the cuprous chloride to bring it to the cupric state and to consume the $H^+$ ions produced during extraction. The cupric chloride formed from the cuprous chloride is again under the optimum conditions for permitting its extraction and remains so while there is still cuprous chloride in the solution.

It will thus be appreciated that the extraction stage which is indicated as a whole by the numeral 11 in the drawing in fact comprises two operations namely $11a$ which is the extraction operation proper, and $11b$ which is the oxidation of the aqueous phase by means of air injected into the solution through a pipe 12.

Two practical methods of carrying out this set of operations will now be described.

In the first, extraction is carried out in the conventional manner in a single mixing and decanting apparatus, and air is injected directly into its mixing compartment. Oxidation takes place in situ in this case, and acid is consumed continuously.

In this second method, use is made of two mixing and decanting apparatuses, and the aqueous phase, upon leaving the first apparatus, passes through an oxidation reaction vessel before entering the second apparatus. The oxidation reaction vessel is fitted with stirring means and a device for drawing air into it, so that oxidation of the solution in this case takes place outside the mixing and decanting apparatuses.

Thus, to carry out extraction of copper by means of a solvent in accordance with the method of the invention, one or two stages using mixing and decanting apparatus are sufficient. It should be pointed out also that, in accordance with the theory here used, it is possible to extract only half of the copper present in the solution if it is required to keep the solvent at its maximum capacity, since, for each $Cu^{++}$ cation extracted, two $H^+$ ions are released in the aqueous phase. It will be readily understood that if it is required to extract more than half of the copper present, it will suffice to increase the ratio of the volume of the organic phase to that of the aqueous phase, and/or the number of extraction stages. However, such a step is generally not of help, since the aqueous solution still containing cupric ions can be recycled to the lixiviation stage where the cupric chloride is again reduced by the initial sulphurized concentrate.

As regards the temperature at which extraction is carried out, this should be at least equal to the ambient temperature but is preferably between 30° and 60° C.

The pH-value of the solution can be kept at a value in the order of magnitude of 1 because of the oxidation of the cuprous chloride by air. The method of the invention can nevertheless be applied to solutions having a pH-value of less than 1, though then conditions slightly below the best exist.

As regards the ratio of the volume of the organic phase to that of the aqueous phase, it is obvious that this should be fixed in dependence upon the operating conditions, and particularly in dependence upon the copper concentration in the extraction solution. By way of example this ratio may be between 0.5 and 5, the charged solvent containing 2 to 10 g/l of cupric ions.

If it is required to carry out complete purification of the solvent charged with cupric ions, it is expedient to wash it with water or cupric sulphate using techniques that are very well known to specialists in the field, so as to eliminate in particular traces of chloride ions as well as other metallic impurities which could have been entrained during extraction.

Returning to FIG. 1, it will be seen that the organic phase 13, resulting from the extraction-oxidation stage 11 that has just been described, is then subjected to an operation 14 for the re-extraction of the copper by means of a sulphuric acid solution 15. The aqueous phase rejoins the lixiviation stage through a pipe 16 as has been stated above.

The reaction 14 takes place in accordance with the following equation:

$$CuR_2 + H_2SO_4 \rightleftharpoons 2\,HR + CuSO_4$$

wherein $CuR_2$ is organic phase 13, and HR is the organic regeneration solvent. This latter can be used again for extracting the copper.

This re-extraction is carried out on a counterflow basis in mixing and decanting apparatuses, the number of which will depend upon the objectives that it is desired to achieve, and particularly upon the required final concentration of cupric sulphate, as well as upon the residual copper content that is permitted in the solvent.

It will be understood that this operation causes the cupric ions, which are present in the organic phase 13, to pass into the aqueous re-extraction phase, and that there is finally obtained an aqueous cupric sulphate solution 17 containing for example 20 to 100 g/l of copper. The regenerated organic phase 18 is obviously used for extracting further quantities of copper. To do this, it is introduced at 19 into the mixing stage of the first mixing and decanting apparatus used for extraction.

EXAMPLE 4

The object of this example was to show that it was possible to produce a very pure copper sulphate from a mixture of cuprous chloride and cupric chloride dissolved in a sodium chloride brine. The anion change was achieved in this example by means of a cationic exchanger sold under the trade-name "LIX 65 N" by General Mills. This type of solvent extracts the $Cu^{++}$ ions contained in the aqueous phase with which it is contacted, and in exchange liberates $H^+$ ions, the $H^+$ ions thus liberated then blocking the reaction before the solvent is completely charged. As a general rule the capacity of the solvent is increased either by causing the aqueous phase and the solvent phase to flow counter to each other through a large number of mixing and decanting stages, or by using a reduced number of mixers and decanters and then continuously neutralizing the liberated $H^+$ ions at the time of extraction by adding an alkaline agent.

On the other hand, according to the invention the method to be described below enables a good solvent capacity to be obtained by using a reduced number of mixing and decanting apparatuses and without the consumption of alkaline agent. In this method, the consumption of the $H^+$ ions produced takes place by oxidizing the cuprous ions by reacting them with air.

Figure 2:
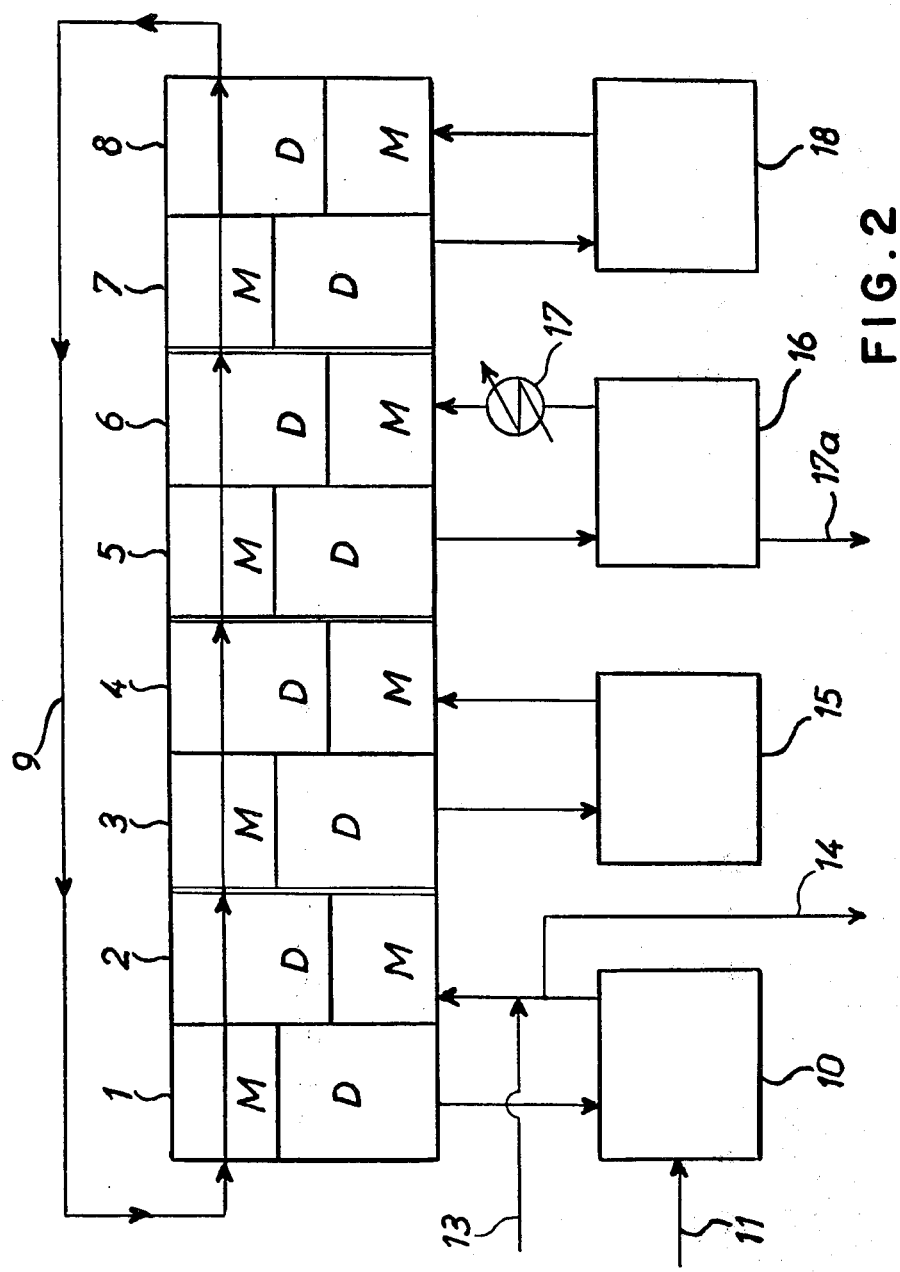
FIG. 2 shows the solvent extraction step.

The installation used for carrying out this method is illustrated very diagrammatically in FIG. 2. This equipment comprises a battery of eight mixing and decanting apparatuses 1 to 8, the mixing compartment of each apparatus being indicated by the letter M and its decanting compartment by the letter D. These apparatuses are arranged head-to-foot alongside one another, that is to say the mixing compartment of any one of them is located opposite the decanting compartment of the next apparatus. As will be seen, the organic phase 13 passes through the entire battery beginning at the mixer of the apparatus 1, and continuing through the decanter of the apparatus 2, then through the mixer of the apparatus 3 and so on.

The mixing and decanting apparatuses 1 and 2 form the copper-extraction stage. As has been stated above, the aqueous phase is at this point subjected to oxidation by air; a part of this phase is continuously moved from the decanter 1 and then passes into an oxidation reaction vessel 10 where air is injected at 11, said part rejoining the mixer 2 through a pipe 12 from which branch a pipe for supplying the solution obtained from the lixiviation stage, and an outlet pipe 14 for the solution from which copper has been in part removed.

The mixing and decanting apparatuses 3 and 4 form the stage at which the solvent is washed for the purpose of eliminating residual chloride ions; the aqueous phase contained in the decanter 3 continuously passes through a wash-water tank 15 before rejoining the mixer 4.

The mixing and decanting apparatuses 5 and 6 form the stage at which copper is re-extracted in a 4 N sulphuric medium. The aqueous phase leaves the decanter 5 at an elevated temperature and passes to a crystallizer 16 where it is cooled to cause crystallization of pentahydrated copper sulphate, $CuSO_4 \cdot 5\,H_2O$ in a 4 N sulphuric medium. Since the temperature of the solution will have dropped because of the recrystallization, the solution is then passed into a heating means 17 from where it moves to the mixer 6 after having regained its initial temperature. At 17a, the copper sulphate crystals produced are extracted from the crystallizer 16. It should also be noted in this connection that when using the complete method on an industrial basis, instead of extracting the copper sulphate crystals, it would be possible to produce on a continuous basis, a copper sulphate solution which could be passed to the electrolysis stage.

Finally, the mixing and decanting apparatuses 7 and 8 form the stage at which the organic solvent is washed; the aqueous solution passes from the decanter 7 to the mixer 8 by way of a washing tank 18.

In this example, the organic liquid-liquid exchange reagent used is the product marketed under the trade-name LIX 65 N by General Mills, which product is dissolved in kerosene in a proportion of 30% by volume.

The operation as a whole is carried out at 60° C; this favours the choice of the above-mentioned organic agent since the latter is known to be stable at the temperature in question. It should be mentioned here that the choice of this temperature offers two advantages: firstly, improvement of the thermal balance of the method as a whole, since excessive cooling is avoided of the feed solution which after part of the copper has been removed therefrom, has to be recycled to the stage at which the initial ore is lixiviated, which lixiviation stage must be carried out at an elevated temperature as stated above, and secondly, there is provided the possibility of producing, if required, crystals of hydrated copper sulphate by exploiting the great difference in the solubility of this product at the working temperature, namely 60° C, and ambient temperature.

After the battery of mixing and decanting apparatuses has been brought to a state of equilibrium with the help of synthetic solutions, the feed solution is passed into the mixer 2 at a rate of 100 ml/h. This solution has the following composition:

Cu total : 73.3 g/l
$Cu^+$ : 50.6 g/l
$Pb^{++}$ : 18.0 g/l
$Na^+$ : 110 g/l
$Cl^-$ : 217 g/l
$SO_4^{--}$ : 1.1 g/l This feed solution is mixed with the recycled solution passing from the oxidation reaction vessel 10 where the $H^+$ ions produced during extraction have been consumed. The delivery rate of the recycling solution is 300 ml/h and this brings the total feed rate to 400 ml/h. This solution passes through the two extraction stages where it flows counter to the solvent. The rate of flow of the solvent is 600 ml/h.

The slightly acid solution from which all copper has been removed is passed into the oxidation reaction vessel 10 where it is neutralized by the reaction for oxidizing the cuprous copper. Part of the neutralized solution is extracted at a rate of 100 ml/h. This solution is for recycling to the lixiviation stage. The other part of the neutralized solution is again recycled to the prime reaction stage at a rate of 300 ml/h, together with fresh solution.

The copper-charged organic solvent then passes through the mixing and decanting apparatuses 3 and 4 where water flowing in countercurrent at 200 ml/h and recycling continuously removes from this solvent the $Cl^-$ ions entrained therein.

In the mixing and decanting apparatuses 5 and 6, the solvent is freed from copper by 4 N sulphuric acid at 60° C. This re-extraction solution is made up of 1.9 l of continuously recycling solution passing between the mixing and decanting apparatuses and the crystallizer 16, which is kept at a temperature of 20° C and in which are deposited the $CuSO_4$, 5 $H_2O$ crystals. The precise initial composition of this solution is as follows:

| | | | |
|---|---|---|---|
| Cu total | : | 43.1 | g/l |
| $Na^+$ | : | 0.01 | g/l |
| $Cl^-$ | : | 0.5 | mg/l |
| $SO_4^{--}$ | : | 290 | g/l |

The solvent from which copper has been removed is then washed with water in the mixing and decanting apparatuses 7 and 8, the wash-water being supplied at a rate of 200 ml/h.

The operation will have continued over a period of 8 hours 30 minutes. The final solutions and the copper sulphate crystals have the compositions indicated in the Table below:

TABLE V

| Item | Total copper g/l or % | $Cu^+$ g/l or % | $Na^+$ g/l or % | $Cl^-$ g/l or % | $SO_4^{--}$ g/l or % |
|---|---|---|---|---|---|
| Feed solution | 73.3 | 50.6 | 110 | 217 | 1.1 |
| Copper sulphate solution before re-extraction | 43.1 | 0 | 0.01 | 0.0005 | 290 |
| $CuSO_4$ crystals obtained (dried at 100° C) | 35.0 | 0 | 0.01 | 0.1 | 47.3 |
| Cupric chloride solution after extraction | 42.2 | 6.22 | 102 | 203 | 0.66 |
| Solution for washing charged solvent | 0.08 | not determined | 0.21 | 1.13 | 0.23 |
| Solution for washing solvent after re-extraction | 0.08 | " | 0.008 | 0.03 | 1.02 |
| Organic solvent after re-extraction and washing | 0.60 | " | 0.24 | 0.0028 | |

These results show that it is possible to produce copper sulphate, practically free from chloride ions, from a cuprous chloride solution in the presence of sodium chloride. The exchange takes place by means of a cationic solution by using a reduced number of mixing and decanting apparatuses, and without the consumption of basic agents.

III. Electrolysis

This operation can be readily carried out by means of techniques which are used on an industrial basis in copper hydrometallurgy, and it will not be described in detail herein.

It suffices to state that copper having what is known as "electrolytic" purity is obtained at the cathode, and that sulphuric acid, which can be used again for the re-extraction operation 14, is obtained at the anode.

IV. Elimination of impurities

The aqueous solution resulting from the extraction of copper at 11 mainly contains cupric chloride and the reagent for solubilizing the cuprous chloride as well as various metallic impurities not capable of extraction by the solvent in the operating conditions used. As stated previously, the major part of this solution is recycled to the lixiviation stage through the pipe 16 (see FIG. 1). The rest of the solution 21 consists of some copper, silver, and other metallic impurities and it is first subjected to treatment at 22 whereby copper is completely removed. This latter treatment can be carried out either by a cementation procedure or by extraction on resins or by means of an anionic solvent, exploiting the readiness with which cupric copper is complexed in a chloride medium in the $CuCl_4^{--}$ form.

The solution from which copper is completely removed in this way is then subjected at 23 to an operation in which silver and other metallic impurities that it contains are recovered, this operation for example making use of iron powder.

The resulting solution 24, which is free of valuable elements, may be disposed of.

We claim:

1. A method for obtaining electrolytic copper from copper-bearing ores comprising:
   a. lixiviating a sulphurized copper concentrate with an aqueous solution containing cupric chloride;
   b. separating into two parts the solution resulting from the lixiviation stage a), one of said parts, containing at least 1 gram of cuprous ions per liter and at last 2 grams of ferrous ions per liter, being subjected to oxidation by air at atmospheric pressure, at a pH-value of between 1 and 3 and, at a temperature above 90° C., with precipitation of goethite and separation thereof, the resulting solution then being recycled to the lixiviation stage a);
   c. partially extracting the copper contained in the other of said parts of the solution resulting from the lixiviation stage a), by contacting said solution with an organic phase containing a cationic solvent, said extraction being accompanied by oxidation by the injection of air;
   d. re-extracting the copper contained in said organic phase by contacting the latter with an aqueous sulphuric acid solution and recycling the organic phase to the extraction stage c); and
   e. treating the copper sulphate solution obtained from the preceding stage to obtain, on the one hand, elemental copper, and, on the other, an aqueous sulphuric acid solution which is recycled to the re-extraction stage d), the major part of the aqueous phase which results from the stage c) at which copper is partially extracted being recycled to the lixiviation stage a).

2. A method according to claim 1 wherein the aqueous lixiviation solution also contains a reagent for solubilizing cuprous chloride which is selected from the group consisting of alkali metal chlorides, alkaline-earth metal chlorides, ammonium chloride, and ferrous chloride.

3. A method according to claim 2 wherein the reagent for solubilizing cuprous chloride is sodium chloride used in an amount between 100 and 300 grams per liter.

4. A method according to claim 1 wherein the lixiviation stage a) is carried out at a temperature above 50° C., and the pH-value of the solution is at most 1.

5. A method according to claim 1 wherein the solution resulting from said oxidation stage in which goethite is precipitated contains at least 1 gram of cuprous ions per liter and at least 2 grams of ferrous ions per liter.

6. A method according to claim 1 wherein the lixiviation stage a) is carried out using a quantity of cupric chloride between 1 and 1.05 times the stoichiometrically necessary quantity, account being taken of the amount of non-ferrous metals contained in the initial product.

7. A method according to claim 1 wherein the extraction stage c) is carried out by means of at least one mixing and decanting apparatus, and the said air injection takes place in the mixing compartment of said apparatus.

8. A method according to claim 1 wherein the extraction stage c) is carried out by means of at least two mixing and decanting apparatuses, and wherein the air injection takes place in an exterior oxidation reaction vessel through which passes the aqueous phase which flows from one to the other of said two mixing and decanting apparatuses.

9. A method according to claim 1 wherein the copper-extraction stage c) is carried out at a temperature between 30° and 60° C.

10. A method according to claim 1 wherein the copper-extraction stage c) is carried out at a pH-value between 0 and about 1, and the ratio of the volume of the organic phase to that of the aqueous phase is between about 0.5 to 5.

11. A method according to claim 1 wherein the organic phase containing a cationic solvent is washed in water following the re-extraction stage d) prior to recycling to the extraction stage c).

12. A method according to claim 1 wherein the copper sulphate solution contains 20 to 100 grams of copper per liter at the treatment stage e).

13. A method according to claim 1 wherein the aqueous cupric chloride solution has an oxido-reduction potential of between 400 and 800 millivolts in relation to the hydrogen electrode potential at the lixiviation stage a) and the stage b) at which the oxidation by air is carried out.

14. A method according to claim 13 wherein, at the oxidation stage b), the rate of delivery of air is so controlled that the oxido-reduction potential of the solution obtained after precipitation of the goethite remains substantially stable.

15. A method according to claim 1 wherein the part of the aqueous phase resulting from the copper-extraction stage c) that is not recycled to the lixiviation stage a) is treated to recover, at least in part, silver and other metallic impurities it may contain.

* * * * *